(12) United States Patent
Kolbet et al.

(10) Patent No.: US 6,308,215 B1
(45) Date of Patent: Oct. 23, 2001

(54) EXTENDER APPARATUS FOR USB CONNECTION OF COMPUTER UNITS

(76) Inventors: Robert J. Kolbet, 3332 Eagles Roost La., Macedon, NY (US) 14502; Michael O. Ingham, 158 Warrington Dr., Rochester, NY (US) 14618

( * ) Notice: Subject to any disclaimer, the term of this patent is extended or adjusted under 35 U.S.C. 154(b) by 0 days.

(21) Appl. No.: 09/218,881

(22) Filed: Dec. 22, 1998

Related U.S. Application Data

(60) Provisional application No. 60/071,272, filed on Dec. 22, 1997.

(51) Int. Cl.[7] .................. G06F 15/173; G06F 15/16; G06F 13/00; H03K 17/16; H03K 19/094
(52) U.S. Cl. .................. 709/233; 709/245; 709/247; 709/250; 710/129; 710/131; 710/132; 326/30; 326/21; 326/86
(58) Field of Search .................. 709/250, 227, 709/230; 710/129, 131, 128, 38; 326/30, 21, 86, 82, 87; 395/750, 492; 713/310, 320, 322, 324

(56) References Cited

U.S. PATENT DOCUMENTS

| | | |
|---|---|---|
| 5,655,138 | 8/1997 | Kikinis . |
| 5,675,813 * | 10/1997 | Holmdahl ..................... 395/750 |
| 5,767,844 * | 6/1998 | Stoye ........................... 345/212 |
| 5,781,028 * | 7/1998 | Decuir ......................... 326/30 |
| 6,105,097 * | 8/2000 | Larky et al. .................. 710/129 |
| 6,131,125 * | 11/2000 | Rostoker ...................... 709/250 |
| 6,151,653 * | 11/2000 | Lin et al. ..................... 710/129 |
| 6,178,514 * | 1/2001 | Wood ........................... 713/300 |

OTHER PUBLICATIONS

Preliminary specification of Philips Semiconductors "Universal Serial Bus transceiver—PDIUSBP11", p. 2 (Jan. 30, 1996).
USB (Universal Serial Bus) Home Page, pp. 1–2 (Sep. 22, 1997) (HTTP://WWW.USB.ORG).
USB Frequently Asked Questions, pp. 1–10 (Sep. 22, 1997) (HTTP://WWW.USB.ORG).
USB Press Releases fro Develors Conference #IV pp. 1–9 (Sep. 22, 1997) (HTTP://WWW.USB.ORG).

* cited by examiner

*Primary Examiner*—Ayaz Sheikh
*Assistant Examiner*—Oanli Duong
(74) *Attorney, Agent, or Firm*—H. S. Ingham

(57) ABSTRACT

An apparatus for extending USB linkage between a host computer and a peripheral unit includes a first extender port, a second extender port, a first extender cable connected to transmit signals from the first to the second port, and a second extender cable connected to transmit signals from the second port to the first, such that outgoing USB signals from each port are identical to incoming USB signals into the other port. Each port is formed of a driver circuit connected to one extender cable, a receiver circuit connected to the other cable, and an interface circuit including a USB transceiver connected by USB cable to the transceiver of the host or peripheral. A logic device connected between the circuits selectively effects outgoing signals on a USB or extender cable. The extender cables are bundled in a combined cable that includes a power line and a line for speed signals.

18 Claims, 13 Drawing Sheets

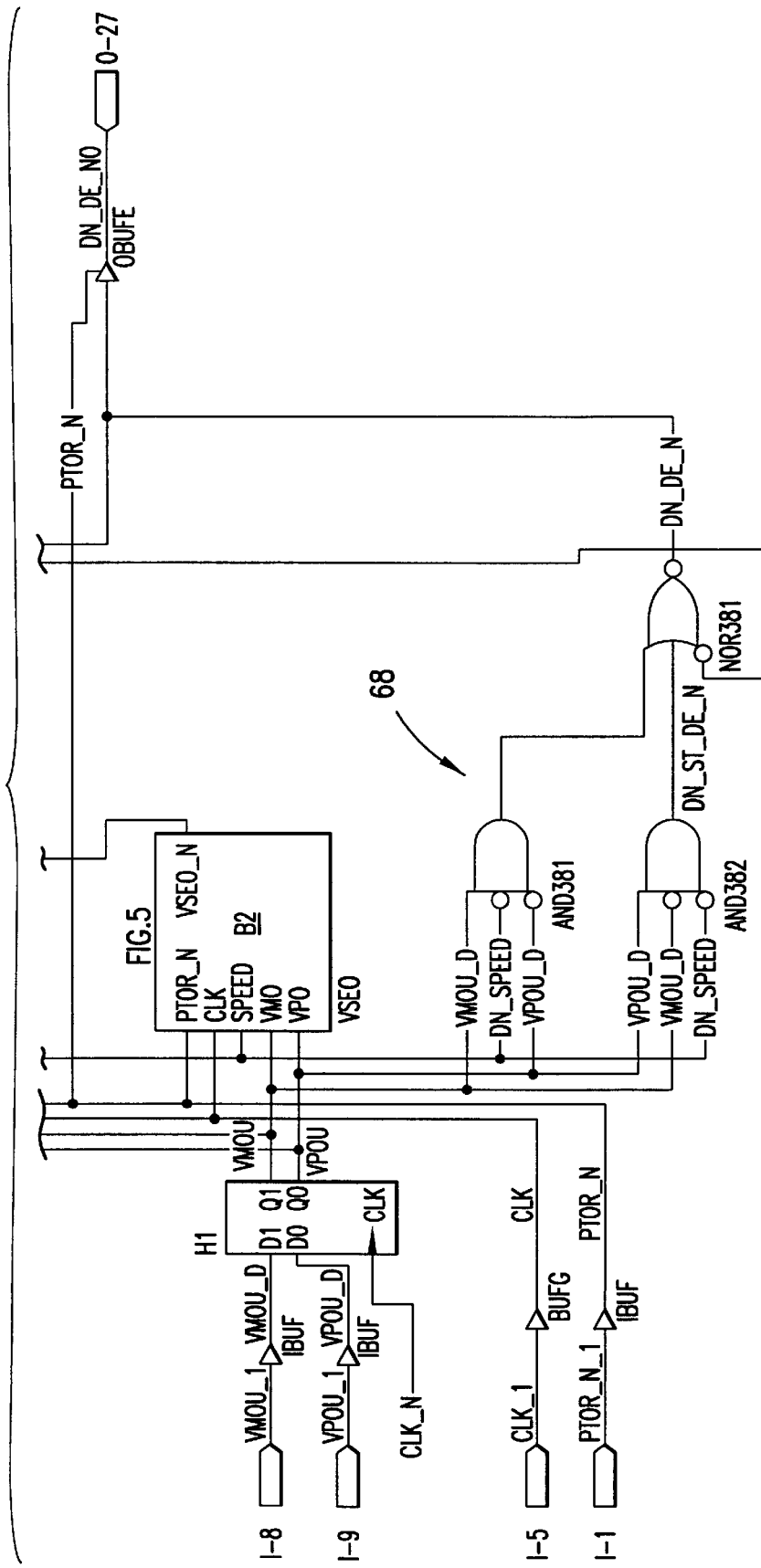

EXTENDER APPARATUS FOR USB CONNECTION OF COMPUTER UNITS

This application claims the benefit of copending provisional patent application serial No. 60/071,272, filed Dec. 22, 1997. This invention relates to connection of computer units, particularly computer units utilizing Universal Serial Bus.

BACKGROUND

Computer systems typically involve a host computer connected by cable to a peripheral unit (or "function") such as a keyboard, mouse, printer, modem, joystick, scanner, video camera, game pad, virtual reality devices, data gloves, mechanical devices, or the like. A connecting system of ports and a cable, termed a "bus", is generally one of two types, either parallel or serial. A parallel bus, usually used for printers, transmits a combination of bits (generally a byte) simultaneously over several wires in a cable. A serial bus transmits the bits in series. However, even a standard serial bus has up to nine wires for auxiliary functions such as request-to-send, data-carrier-detect and other "handshake" signals. Also, different peripherals utilize different port and cable configurations so that interchangability is limited, and a host computer usually contains several different types of ports with connectors for the different peripherals. Moreover, it is difficult to assemble a series of peripherals such as with a mouse connected to a keyboard.

Recently a group of industry leaders developed standards for an advanced system called "Universal Serial Bus", or "USB", intended for all types of computer units including peripherals. Only one pair of twisted wires is required in the cable for data transmission, although another pair provides power from a host to the peripheral units. To implement signal transmission and sufficient auxiliary information, both signal wires transmit pulses in parallel with a specified protocol or relativity of signals. During idle condition (no sending of data), one or the other is at a steady voltage with the other at zero, to indicate which of two transmission speeds are in effect. An end of a packet of data or other information (handshake, etc.) is signaled by both wires being at zero voltage before returning to idle. The host arbitrates between peripherals and the host so that while one unit is transmitting the other is in a receive mode.

USB specifications are available from the USB Implementers Forum via internet http://www.usb.org. These allow for up to 127 devices, two speeds and a maximum of 5 meters per cable segment. A computer system can have one or more "starred" hubs for multiple connections of computer units. The length limitation is related to the specifications on time delay, impedance and other electronic aspects that effect allowable noise levels. However, there is a need for longer cables, for example for a host computer controlling other computer units such as video cameras, security devices or building functions, or for connecting two personal computers at a distance.

Accordingly, an object of the invention is to provide an apparatus for extending cable length between computer units that incorporate Universal Serial Bus technology. Another object is to provide such apparatus at a modest cost.

SUMMARY

The foregoing and other objects are achieved by an apparatus for extending USB linkage between a first computer unit and a second computer unit, the units respectively having a first USB port and a second USB port for the linkage. The apparatus includes a first extender port having means for connecting with the first USB port to pass USB signals therebetween, a second extender port having means for connecting with the second USB port to pass USB signals therebetween, a first extender cable connected to carry first extender signals from the first extender port to the second extender port, and a second extender cable connected to carry second extender signals from the second extender port to the first extender port. The first extender port is receptive of first incoming USB signals from the first USB port to effect the first extender signals as representative of the first USB signals, and the second extender port is receptive of the first extender signals to effect first outgoing USB signals to the second USB port. The first outgoing USB signals are representative of the first extender signals, such that the first outgoing USB signals are substantially identical to the first incoming USB signals. Similarly, the second extender port is receptive of second incoming USB signals from the second USB port to effect the second extender signals as representative of the second USB signals, and the first extender port is receptive of the second extender signals to effect second outgoing USB signals to the first USB port. The second outgoing USB signals are representative of the second extender signals, such that the second outgoing USB signals are substantially identical to the second incoming USB signals.

In a preferred aspect, each extender port is formed of an interface circuit with the corresponding USB connections, a driver circuit connected to one extender cable so as to transmit outgoing extender signals, and a receiver circuit connected to the other extender cable so as to receive incoming extender signals. A controller is operatively connected between the interface circuit, the receiver circuit and the driver circuit to selectively effect the outgoing USB signals or the outgoing extender signals. Advantageously each controller is a programmable or ASIC logic device, and each interface circuit includes a USB transceiver.

In further aspects, each receiver circuit effects receiver signals representative of the extender signals incoming to the receiver circuit, and the interface circuit is receptive of the receiver signals to selectively effect outgoing USB signals representative of the receiver signals. The controller has means receptive of the receiver signals to effect an enabling signal that signifies enablement while the incoming extender signals contain a packet sequence, and otherwise signifies disablement. The interface circuit has means receptive of the enabling signal for enabling transmission of the outgoing USB signals only during enablement, so that the outgoing USB signals are transmitted only while the incoming extender signals contain the packet sequence. For the incoming USB signals, the interface signals comprise data signals and speed signals representative of selected speed. The controller is receptive of the data signals, the speed signals and the enabling signal (previously effected by the controller) to effect the outgoing extender signals only during disablement of outgoing USB signals.

In a typical USB interface circuit, the speed signals are also intermittently representative of non-speed data; in such case it is advantageous for at least one controller to include further means for converting the speed signals into a speed indicator signal representative only of selected speed. The indicator signal is representative of the speed signals to effect the enabling signal with the receiver signals.

The first and second extender cables are combined conveniently into a single extender cable containing several other electrical lines. For one such line, only one controller effects a speed indicator signal, and a signal line is connected to transmit the speed indicator signal to the other controller. For another such line, the first extender port further includes a first power supply for powering circuit components and signals of the first extender port. This power supply has a first input connector receptive of an external power source such as 24 volts DC, and has a first output connector connected to the first input connector. The second extender port further includes a second power supply for powering circuit components and signals of the second extender port. The second power supply has a second input connector for power input. The combined cable includes a power line connecting the first output connector and the second input connector to power the second power supply from the same external power source.

DETAILED DESCRIPTION

Figure 1:
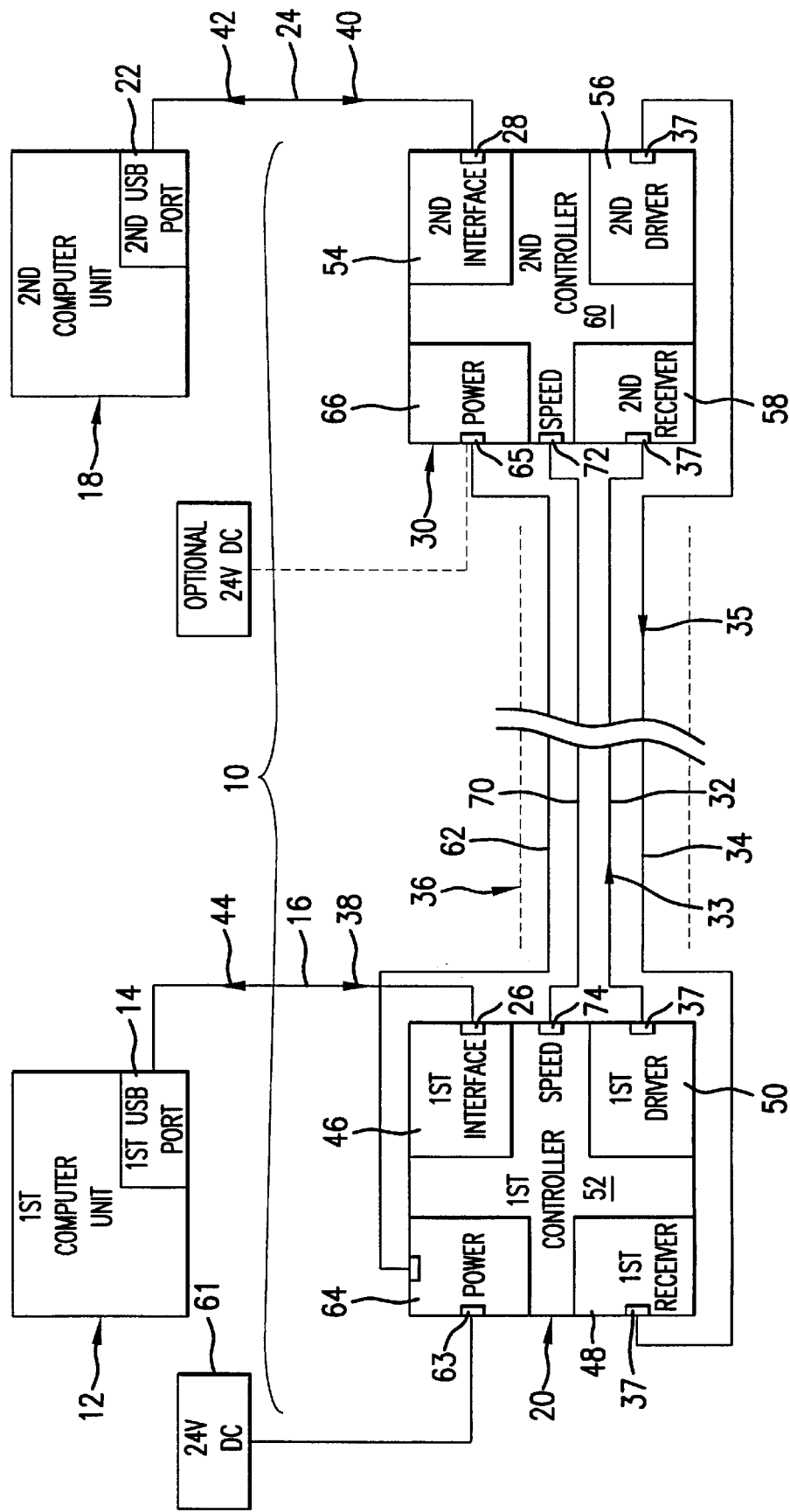
FIG. 1 is a block diagram of two computer units connected by an apparatus of the invention including two extender ports connected by extender cables.
Figure 2A:
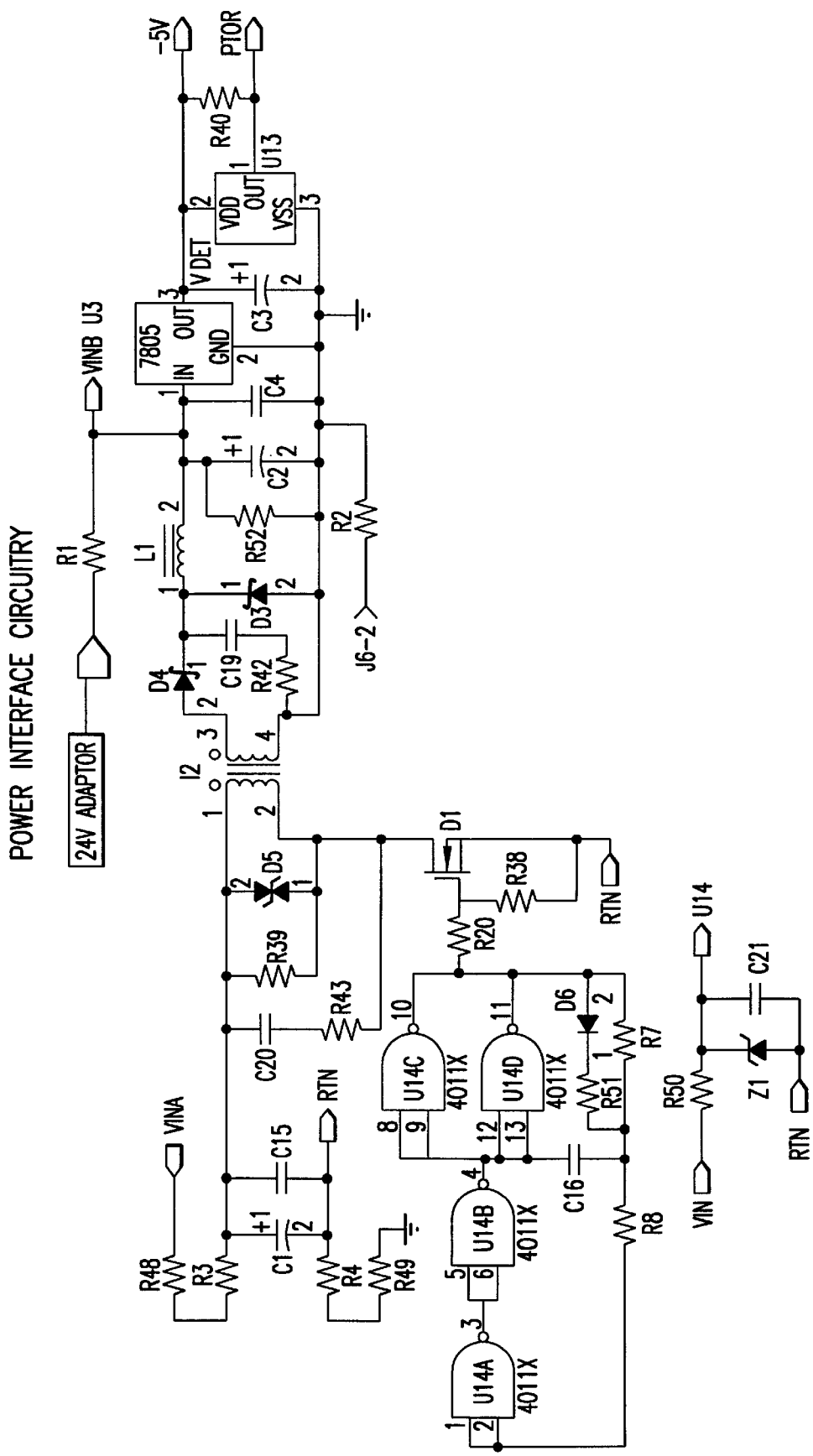
FIG. 2 is a schematic circuit diagram of an extender port of the apparatus of FIG. 1.
Figure 2B:
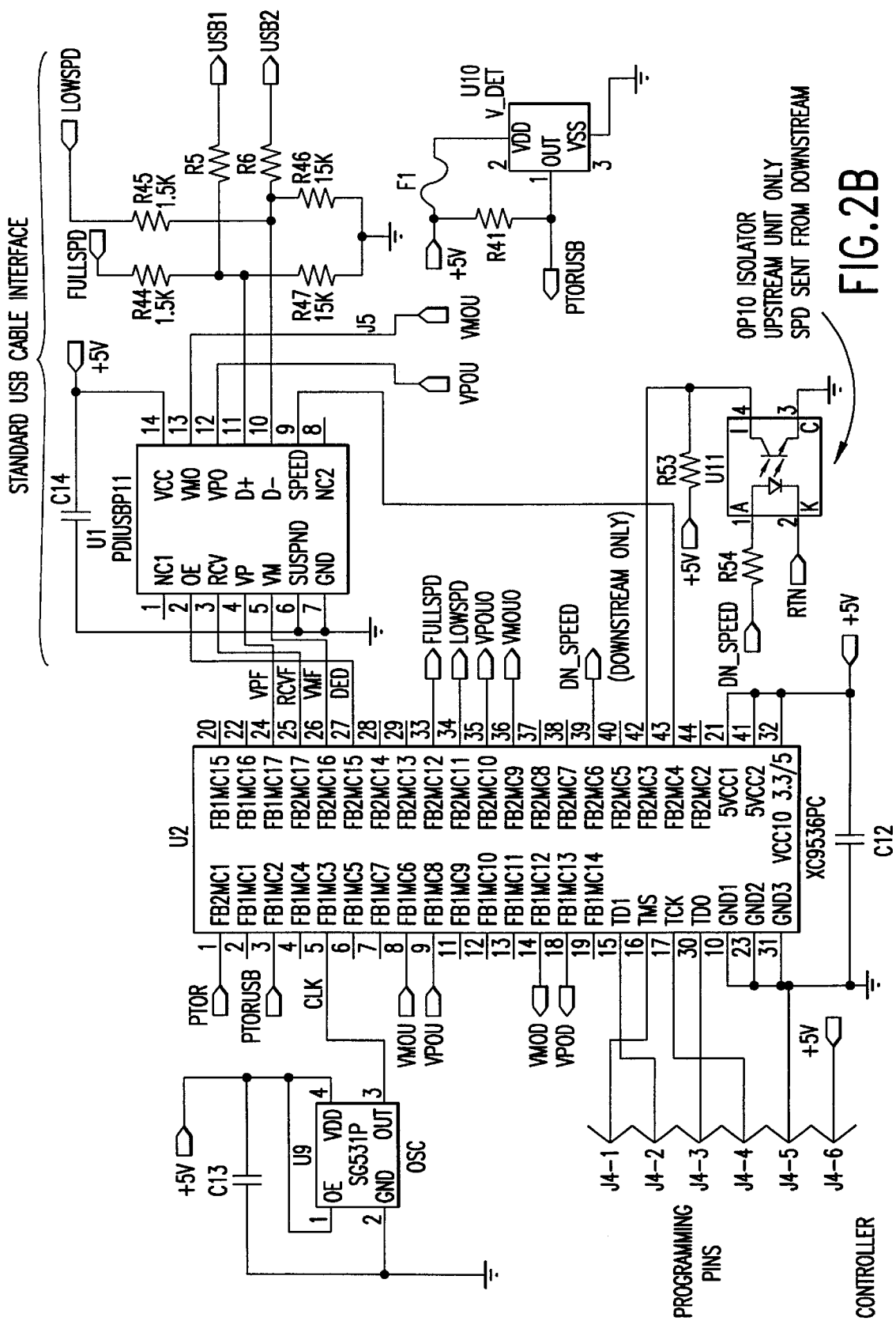
Figure 2C:
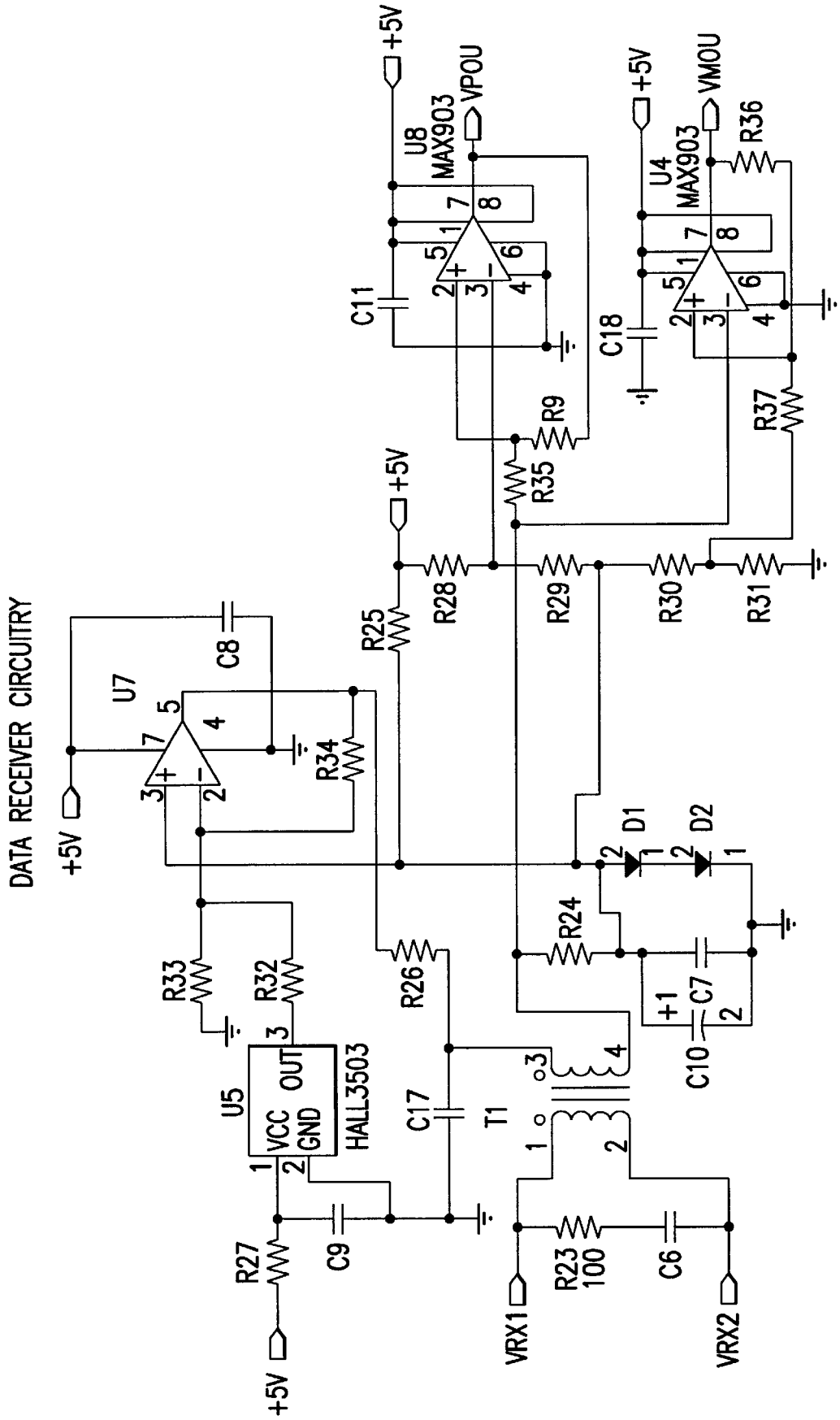
Figure 2D:
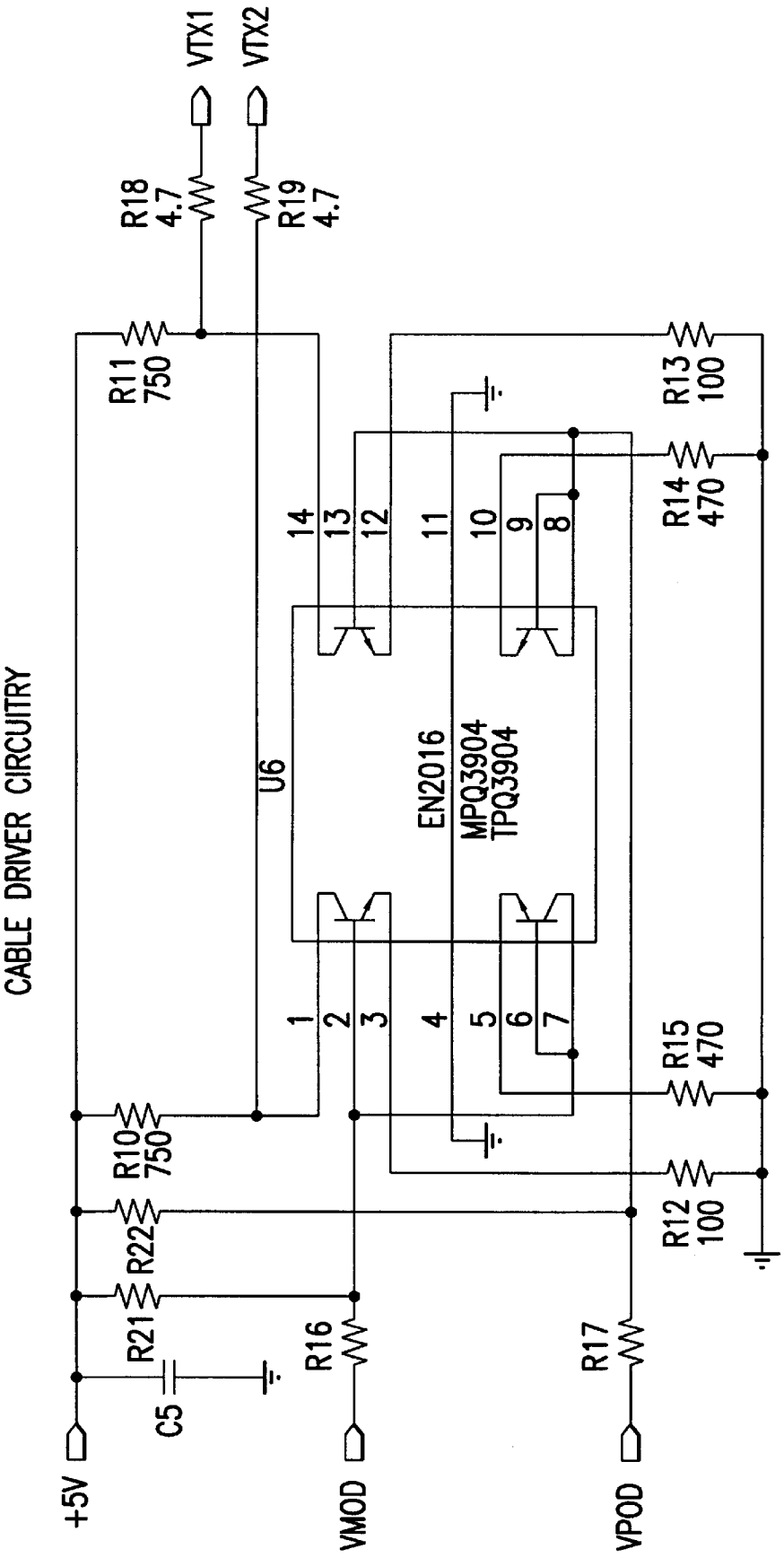

The present cable extending apparatus (FIG. 1) is for linking a first computer unit and a second computer unit. Typically, the first unit is a host or computer or hub, and the second unit is a peripheral device or function such as a modem, telephone, memory storage device (disk, tape, CD ROM), printer, mouse, joystick,. scanner, keyboard, tablet, videocam, virtual reality device, or the like. However the two linked computer units may be two peripherals or two computers being connected for interchange of data. Several peripherals in a computer system may be involved in series or in parallel with one or more peripherals or computers acting as hubs, for example a keyboard hub connecting between a host computer and several devices such as cameras and a mouse. More than one cable extender may be used in a chain of units.

The present apparatus is associated with Universal Serial Bus ("USB") technology. Thus the first and second computer units respectively have a first USB port and a second USB port, these ports each being a USB transceiver connecting with a conventional serial interface engine in the computer. With USB protocol and programmed logic, such transceivers effect the USB signal format, and send, receive and control signal traffic through the connecting cables between the computer units.

A USB cable currently consists of two pairs of twisted wires. One pair carries power from a host computer to a peripheral unit. In the other pair, each wire carries signals in the form of voltage pulses, with a protocol such that the relativity of the pulses between the wires not only provides packets of byte data but indicates one of two available transmission speeds and zero signals that may signify end of packet or disconnect. One computer unit such as a host governs the sending and receiving of USB signals between the two. The cable passes data both ways, with the USB transceiver selectively coordinating the traffic so that signals are sent only one way at a time. As indicated above, the USB specifications also limit cable length for reasons that include specifications on voltage, current, impedance limitations, signal/noise limitations and cable propagation time. The present invention is directed particularly to extending cable length. (Circuitry and signal transmissions described herein are electrical, except that logic devices may contain optical components such as light emitting diodes or other electro-optical devices.)

USB transceivers are available commercially, for example Philips Semiconductors PDIUSBP11 generic Universal Serial Bus transceiver chip having specifications dated Jan. 30, 1996. These specifications are incorporated herein by reference, as such a device is utilized advantageously in an apparatus of the present invention. The specifications include logic for translating signals to and from the USB cable. Other suitable transceivers may be used.

Data bits are effected customarily in the form of square pulses having a bit time of 80 ns or 640 ns. According to well known convention the bits are either 0 or 1, the "1" actually being a higher voltage such as 3.3v or 5v pulse height, and the "0" being a lower voltage such as zero. The present description will use the 0 and 1 designation which should be understood to mean the appropriate voltage. In USB the signals (and associated terminals) on the respective cable wires are designated D+ and D. The signal voltages are applied separately to the two wires with respect to a level near ground (through a transistor), not each other. The signals depend on a prevailing operating speed of 12 megabytes per second (MB/s) (high speed) or 1.5 MB/s (low speed). For high speed the idle condition (standby, no data transmitted) is with D+=1 and D−=0; for low speed, idle is with D+=0 and D−=1. In either case the idle condition is known as J-state. In a packet of data or other information (handshake, etc.) consisting of a series of 1 and 0 bits, the state is toggled between J-state and an opposite K-state which is D+=0 and D−=1 for high speed and D+=1 and D−=0 for low speed. The end of a packet is indicated by D+=0 and D−=0 ("single ended zero" or "SEO"), which is followed by a return to J-state. SEO not followed by the return may reflect a disconnect. The condition D+=D−=1 (1,1) is an error condition. A standard USB transceiver translates the signals to and from conventional serial pulses for the associated computer unit (host or peripheral), and also designates speed for incoming signals. A serial byte may contain auxiliary information such as parity which is not of present interest. In the present invention the D+ and D− levels, including idle condition, data and handshake pulses and an SEO condition, are passed along "verbatim" without regard to meaning. However, certain of this information is decoded to implement the invention.

In a typical installation (FIG. 1), a first computer unit 12 has a first USB port 14 with a first USB cable 16 connected to it, and a second computer unit 18 has a second USB port 22 with a second USB cable 24 connected to it. An apparatus 10 of the invention includes a first extender port 20 having means 26 for connecting with the first USB port to pass USB signals therebetween, such means including a suitable terminal for the USB cable, or a cable hard-wired to the port. A second extender port 30 has similar means 28 for connecting with the second USB port to pass USB signals therebetween. A first extender cable 32 is connected to carry first extender signals 33 from the first extender port to the second extender port, and a second extender cable 34 is connected to carry second extender signals 35 from the second extender port to the first extender port. Each extender cable consists of a pair of wires that should be twisted to reduce noise; or coaxial cable could be used. The two extender cables preferably are bundled into a single, combined cable 36 connected between the extender ports. For convenience and low cost, it is advantageous to use conventional category 5 UTP telephone cable which contains four pairs of unshielded twisted wires, two for the extender cables with the other two being available for power and speed signals as described below. Connections 37 of the combined cable to the ports may use standard 8-pin telephone connectors or any other suitable means. The length of the extender cable is not restricted to maximum of 5 m for USB based on specified maximum delay time (taking into account hub delays). The length may be as long as about 100 m for high speed operation, or about 830 m for low speed.

It is expected that the extender ports 20, 30 ordinarily will be separate entities located outside of the computer units. The USE cables 16, 24 to the computer units may be as short or long as desired, generally within USE specifications. The USB cables may be conventional, for example with a captive cable from a peripheral and a free cable to the host. Standard series "A" or series "B" connectors may be used, with adherence to USE specifications to prevent violating connections. Alternatively the extender ports may be installed in one or both of the computer units, with the means for the USE connection then being internal wiring without USB cables.

The first extender port 20 is receptive of first incoming USE signals 38 from the first USE port 14 to effect the first extender signals 33 as representative of the first incoming USB signals. The second extender port 30 is receptive of the first extender signals to effect first outgoing USE signals 42 to the second USB port 22. The first outgoing USE signals are representative of the first extender signals and substantially identical to the first USE signals. Similarly, the second extender port 30 is receptive of second incoming USE signals 40 from the second USE port 22 to effect the second extender signals 35 as representative of the second USE signals. The first extender port is receptive of the second extender signals to effect second outgoing USE signals 44 to the first USE port. The second outgoing USE signals are representative of the second extender signals and substantially identical to the second USB signals. Thus the two extender ports and the interconnecting cable generally have configurations and operations that are symmetrical both ways, although preferably with some minor variations. ("Substantially identical" means identical information transmission, but with possible minor differences in waveform, noise and the like.)

The first extender port contains a first interface circuit 46 with the first USB connector 26, and a first driver circuit 50 connected to the first extender cable 32 so as to transmit the first extender signals 33. A first receiver circuit 48 is connected to the second extender cable 34 so as to be receptive of the second extender signals 35. A first controller 52 is operatively connected between the first interface circuit, the first receiver circuit and the first driver circuit to selectively effect the second outgoing USB signals 44 or the first extender signals 33. The interface and receiver circuits should match the cable impedance which for the category 5 telephone cable is about 100 ohms.

Similarly, the second extender port contains a second interface circuit 54 with the second USB connector 28, and a second driver circuit 56 connected to the second extender cable 34 so as to transmit the second extender signals 35. A second receiver circuit 58 is connected to the first extender cable 32 so as to be receptive of the first extender signals 33. A second controller 60 is operatively connected between the second interface circuit, the second receiver circuit and the second driver circuit to selectively effect the first outgoing USB signals 42 or the second extender signals 35.

One pair of wires in a USB cable normally carries power which, in a typical configuration, provides power from the host to the peripheral. Power for the extender ports may be received in the same manner from one or both of the computer units. However, in most present computers this has a low voltage of either 5 volts or 3.3 volts, according to specifications, that is used for the data signals. This may be insufficient for extended cables having significant resistance and IR power loss. Therefore, a separate power source is desirable to provide a sufficiently higher voltage for transmission. This may be any conventional or other desired AC or DC power supply with appropriate output.

In the present example a standard adapter plugged into a 110 volt line source is convenient for a supply 61 of 24 volts DC to a terminal 63 in one of the extender ports as shown (FIGS. 1 and 2). According to an aspect of the invention, such higher voltage is sent to the other extender port on one of the extra wire pairs 62 in the combined extender cable. Thus in one extender port the power supply has input from a 24 volt adapter which is omitted for the other port. For the other port, a connection is made through the combined cable between terminal VINA of the port with the adapter to terminal VINB of the other port. The other wire in the pair is grounded. Optionally the cable wires 62 may be omitted and replaced by a second source 67 of 24v DC (or other) to the terminal 65.

(The following description sets forth the numeral designations for an extender port of main focus followed parenthetically by those for other port. The reverse operations with parenthetical components are reciprocal.)

A conventional power supply circuit 64 (66), for example, comprises the 24v DC input terminal VIN, an oscillator formed of NAND gates U14 and a transistor Q1 to effect AC, a step down transformer T2, a rectifier of two diodes D3, D4, an LC filter L1, C2, and a voltage regulator U3 to provide a 5 volt output for signal pulses and device power. A reset signal PTOR_N<=0 ("active low") is provided from a Schmitt trigger U13 timed with capacitor C3 and resistor R40 for pullup via terminal PTOR when full voltage is reached after power is turned on. If a peripheral unit needs power, it is supplied through the power wire pair in the USB cable between the peripheral and the power supply terminals +5v and ground in the nearby extender port. The power wire pair in the USB cable from the host then is not needed.

The interface circuit 46 (54) includes resistors R5 and R6 linking a USB cable to terminals D+ and D− of a device U1 which preferably is a conventional USB transceiver, the USB cable thus being interfaced conventionally into the extender port. The output of the transceiver U1 is fed to the controller U2 in the controller circuit 52. The bridge resistors R44, R45, R46, R47 connecting to terminals LOWSPD and FULLSPD are for a pullup explained below. Alternatively, a transceiver could be fabricated for the present apparatus with similar logic, or at least some of the logic could be incorporated into the controller U2. In the latter case, at least a portion of the interface circuit (particularly the logic portion) may be included in the controller. For clarity as presented herein and in the claims, the interface circuit is separate. However, incorporation of interface logic and associated circuitry into the controller is intended to be included.

Driver signals from the controller device U2 are routed to the driver circuit 50 (56) via terminals VPOD and VMOD. These signals are 0 or 1 with respect to ground. The driver converts digital driver signals from the controller to analog and matches impedance through a transistor bridge US and associated resistors to send extender signals into an extender cable via terminals VTX1 and VTX2. These signals go to the receiver circuit 58 (48) of the other extender port.

The receiver circuit 48 (58) has terminals VRX1 and VRX2 connected to the other extender cable to receive extender signals from the driver circuit 56 (50) of the other extender port. The receiver circuit isolates the associated extender cable with a transformer T1 and converts the analog extender signals to digital with respect to ground by means of a Hall device U5 (associated with the transformer), diodes D1, D2 and operational amplifiers U4, U7, U8. The digital receiver signals (each with respect to ground) on terminals VPOU and VPMU are directed to corresponding input terminals VPO and VMO on the transceiver U1.

It is advantageous to use a conventional USB transceiver such as the phillips PDIUSBP11 which (per specification) has terminals D+ and D− connected to the USB cable wires for sending and receiving the respective USB signals. The transceiver operates as a logic device. Signals are received into terminals VPO and VMO to put representative USB signals into the associated USB cable via D+ and D− (Table 1). The SPEED signal from the controller is described below.

TABLE 1

| In: | | | Out: | | |
|---|---|---|---|---|---|
| VPO | VMO | SPEED | D+ | D− | Result |
| 1 | 0 | 0 | 1 | 0 | Logic 1 |
| 0 | 1 | 0 | 0 | 1 | Logic 0 |
| 1 | 0 | 1 | 0 | 1 | Logic 1 |
| 0 | 1 | 1 | 1 | 0 | Logic 0 |
| 0 | 0 | na | 0 | 0 | SEO |
| 1 | 1 | na | 1 | 1 | Undefined |

When receiving USB signals, U1 effects corresponding serial data on terminals RCV, VP and VM. The RCV level is 1 if D+ is greater (by 200 mv) than D−, and is 0 if D− is greater (by 200 mv). Speed representations, or single ended zero (SEO) or error designation are on terminals VP and VM (Table 2).

TABLE 2

| In: | | Out: | | | |
|---|---|---|---|---|---|
| D+ | D− | RCV | VP | VM | Result |
| 1 | 0 | 1 | 1 | 0 | Logic 1 |
| 0 | 1 | 0 | 0 | 1 | Logic 0 |
| 1 | 0 | 1 | 0 | 1 | Logic 0 |
| 0 | 1 | 0 | 1 | 0 | Logic 1 |
| 0 | 0 | 0 | 0 | 0 | SEO |
| 1 | 1 | 1 | 1 | 1 | Error |

The data signals RCV, and signals VP and VM (representing speed) are routed to the controller U2. Connection between the OE terminal on the transceiver and the OED terminal on the controller is for output enablement as explained below.

The controller U2 is a logic device which may be any suitable type to perform the logic described below. For example the device may be in the form of appropriate gates formed on a board or in a chip made available specifically for the present purpose. Advantageously the device is a programmable logic device such as a Xilinx type XC9536PC, with application-specific integrated circuits (ASIC) (gate arrays). Programming my be relied upon fully for the controller function, or the device U2 may be used in conjunction with logic circuits in a hybrid, as in the present example. As the programming is not normally to be changed after installation, the program should be firmed in. Pins J4 provide for the programming. More broadly, any computer device or system may be used with the logic in software or firmware. Programming is in a conventional language such as Virilog High Level Design Language (VHDL) that is compatible with the logic or other computer device. Those with ordinary skill in the art will readily be able to program such a device based on the logic and explanations presented herein. A conventional computer clock U9, such as an Epson SG53IP, is connected to the controller.

In the present example the apparatus is utilized between a host computer and a peripheral unit (function). There are some minor differences between the programmed control in the upstream extender port (near the host) and the downstream port (near the peripheral) so as to recognize disconnects. The circuit diagram (FIG. 2) is directed to the downstream port; any differences for the upstream port including connections and terminal designations will become apparent. In terminal and signal identifications, letters are added to the basic identifications. The letter "D" designates downstream port signals, the letter "U" designates signals coming from upstream port, "F" means from the USB function or peripheral, "H" means from the USB host, "I" designates input, "O" designates output, "UP" and "DN" respectively designate upstream and downstream, "N" distinguishes certain signals from associated terminals.

In a diagram (FIG. 3) for the controller U2 of the downstream port, logic is divided into four hierarchy blocks B1 to B4, with input blocks H1 and H2 and support circuitry of amplifiers and inverters. Logic gates 68 are shown hard coded directly instead of functionally by programming equations. Terminal numbers correspond to those of device U2 (FIG. 2) preceded by letter "I" for input or "O" for output.

Extender signals VMOU_I and VPOU_I are received from the upstream port and forwarded as digital receiver signals to the controller terminals VPOU and VMOU. Blocks H1 and H2 are input latches enabling synchronization to the clock. Signals from the peripheral via USB cable are converted by the transceiver U1 and corresponding signals VPOU and VMOU are applied to the logic device input terminals RCVF (from RCV, FIG. 2), VPF (from VP) and VMF (from VM). Clock (CLK) and reset (PTOR_N) signals are also received. Clock signals are used for timing counts where applicable. Pullup input PTOR from the power supply causes an initial delay of computations until after power is turned on and voltage reaches full level.

Figure 4:
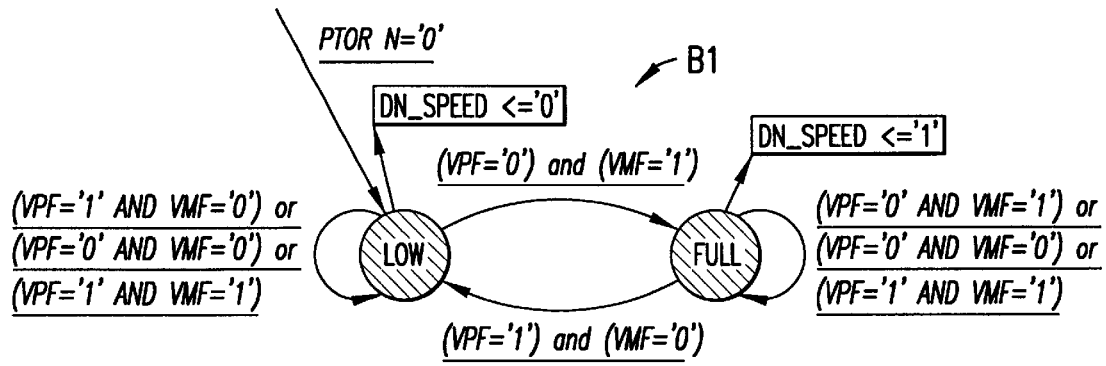
FIGS. 4–6 are diagrams of logic state machines for logic states shown in FIG. 3.

Speed level generally is determined by a peripheral that defines a J-state. Logic block B1 (FIG. 4) generates a speed signal based on VP and VM (Table 2) from the transceiver U1. Low speed state is indicated by condition VPF, VMF= 1,0 to effect a low speed signal DN_SPEED<=0 which is maintained for this condition as well as SEO and error (1,1) until VPF, VMF=0,1. The latter condition switches the state to effect a high speed signal DN_SPEED<=1 which is maintained until VP, VM=1,0 which switches the state back to low speed. The reason a separate speed signal is needed from VP and VM is that the latter pair can be 0,0 (or 1,1 error) and therefor do not always designate speed. The speed signal is applied to subsequent blocks and the transceiver U1, and sent as signal SPD from U2 terminal 39 on one of the wires 70 (FIG. 1) in the extra (fourth) wire pair in the combined extender cable. The other wire in the twisted pair is grounded. (An opto isolator U11 shown in FIG. 2 is in the upstream port only, described below.)

Figure 5:
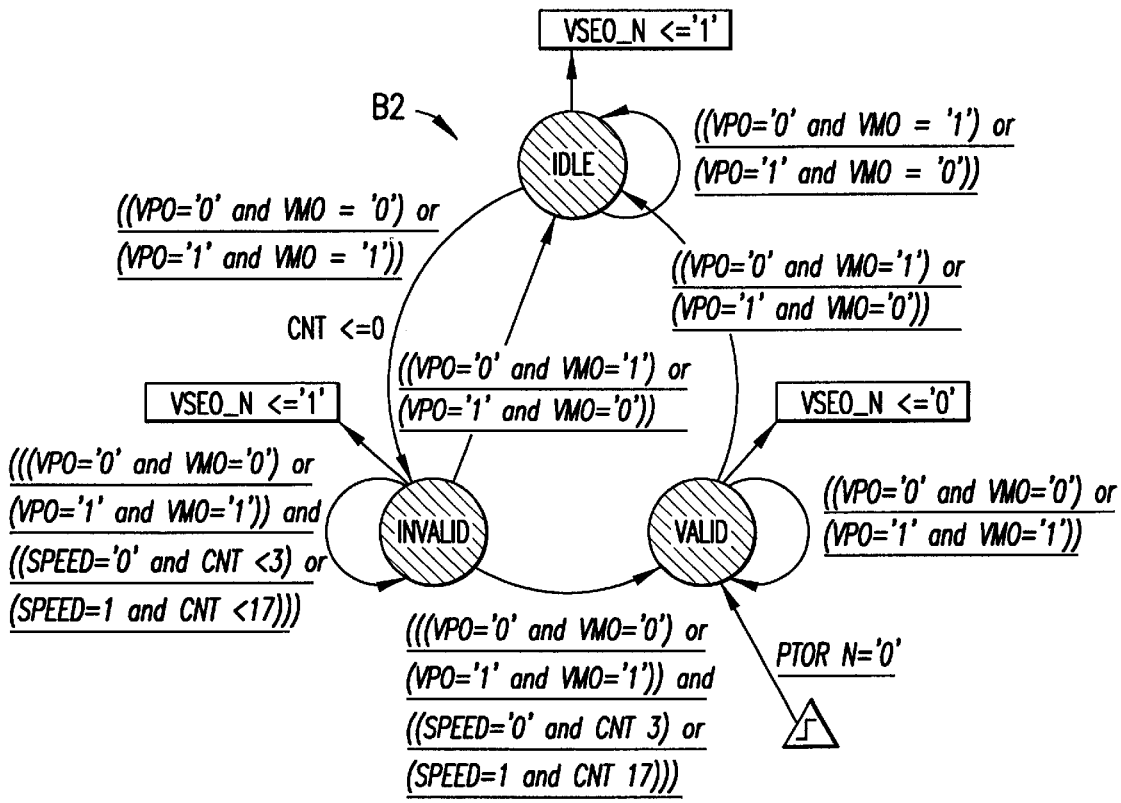

Logic block B2 (FIG. 5) verifies single ended zero (SE0) from incoming extender signals VPOU and VMOU, to signify an end of packet (EOP). In effect, each extender port is always listening to the other port for SE0. The same protocol is used as for input VPO, VMO to the USB transceiver (Table 1). An "idle" state is maintained as long as VPOU, VMOU not=0,0 (representing no SE0), thereby effecting a signal VSEO_N<=1. When SE0 first occurs (VPOU, VMOU=0,0), the state is switched to "invalid" and the same signal is maintained at least initially, as a short period of SE0 is considered invalid. Valid SE0 is assumed to be established after 40 ns of SE0 for high speed and 330 ns for low speed according to USB specifications, thus verifying the condition over a spurious signal. Valid SE0 and corresponding end of packet (EOP) are determined by counting clock cycles in this state of VPOU, VMOU=0,0. With a 20 ns clock cycle, there are 3 counts (rounded up 1 for asynchronization) for high speed or 17 counts for low speed. However, as the host computer may proceed sooner, a lower number such as 14 counts may be better for low speed. If the counts are reached the state switches to "valid" and effects a signal VSEO_N<=0 (active low) to indicate valid SE0. Any condition VPOU, VMOU not=0,0 switches the state back to "idle" with VSEO_N<=1. The error condition (1,1) is treated as SE0 in this stage. When the power is turned on, the reset signal PTOR_N>=0 triggers the valid SE0 state (and other initial states as shown for other logic blocks).

Figure 3A:
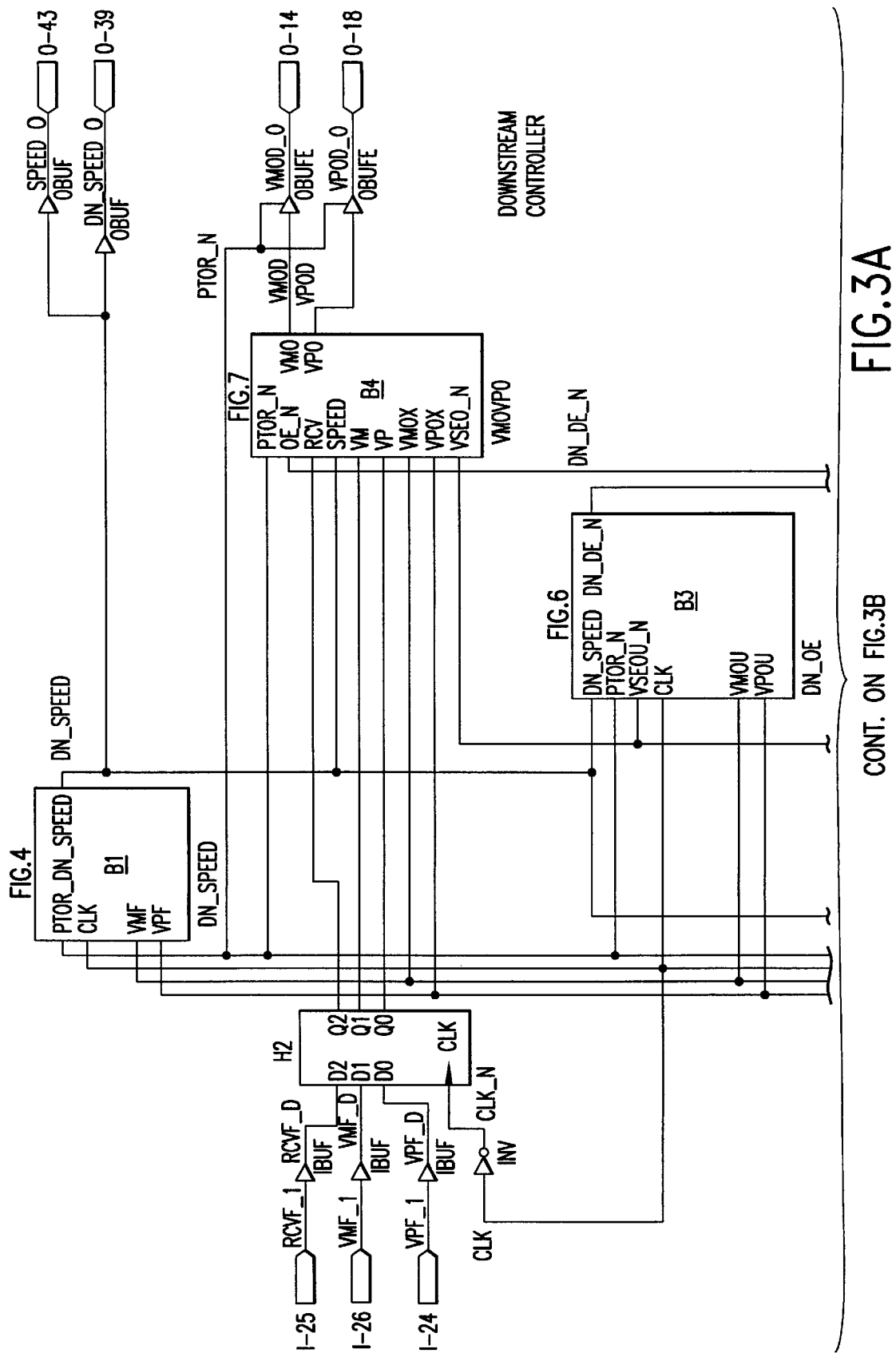
FIG. 3 is a block diagram of circuitry and logic states for an upstream controller in an extender port of the apparatus of FIG. 1.
Figure 6:
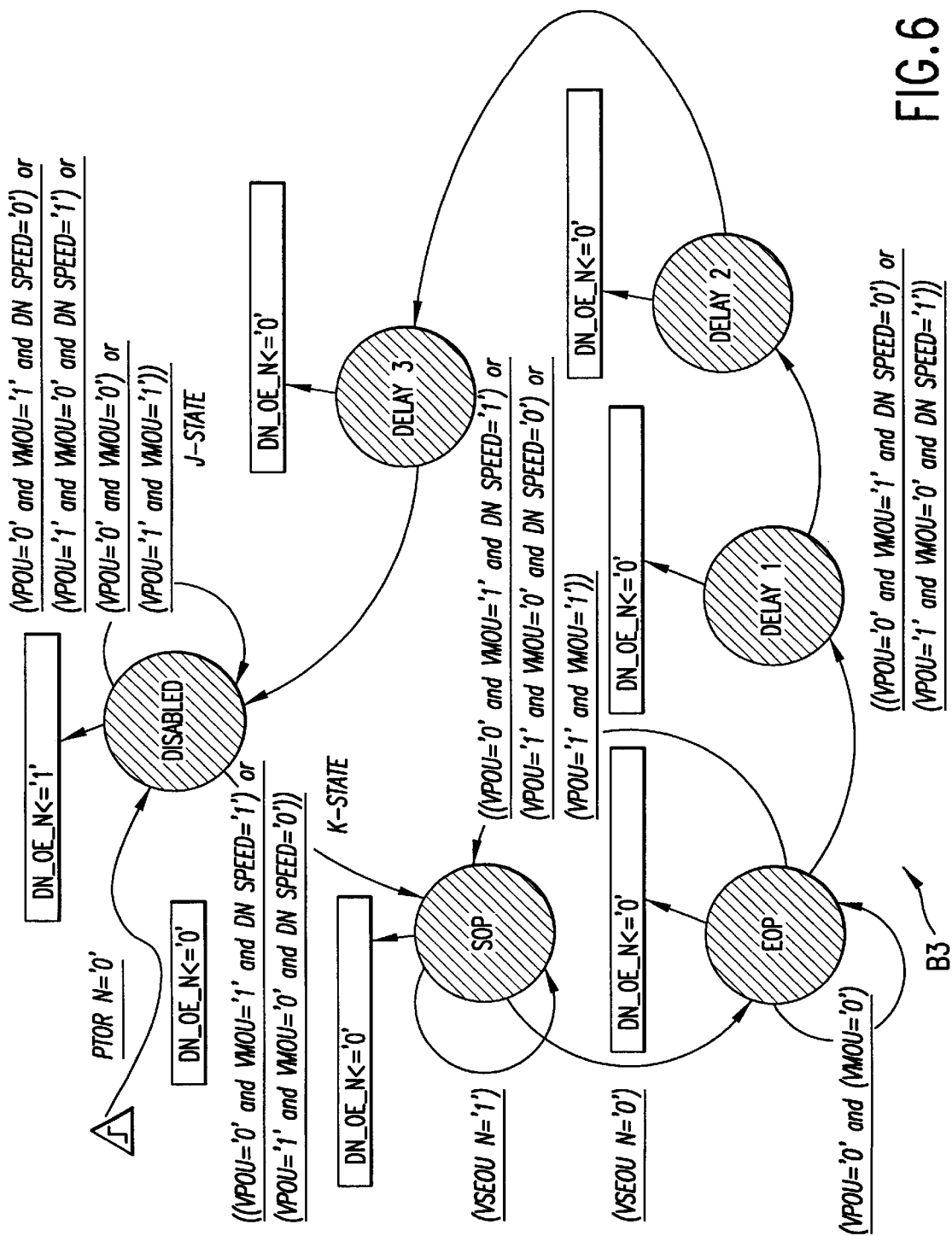

Logic block B3 (FIG. 6) is for output enable (OE). This has inputs from the extender cable (VPOU and VMOU) and from verified SE0 (VSEOU). The conditions for "disabled" are J-state (or SE0 or error), and a corresponding signal DN_OE_N<=1 is effected for this state. When a K-state signal arrives the state machine is switched to signify start of packet ("SOP"), and an enabling signal DN_OE_N<=0 (active low) is effected. This is maintained as long as VSEOU_N=1 signifies no valid SE0. When end of packet EOP is signaled by VSEOU_N=0 (active low), an "EOP" state is entered and maintained as long as continuing SE0 is acknowledged. When any other signal arrives, the state goes back to the "disabled" idle state, effecting signal DN_OE_N<=1. As indicated in FIG. 3, the enabling output signal from logic block B3 is actually in an intermediate form DN_ST_OE_N. This signal is fed through a set of logic gates 68 to effect the signal DN_OE_N. These gates further ensure filtering out of the error condition D+=D−=1 (1,1) for the enabling signal.

Thus enablement exists only during transmission of a packet sequence that includes the basic byte packet and the following verified SE0. The enablement signal (VSEO_N<=0) (active low) is applied to the next block B4, and to the terminal OE of transceiver U1 via terminal OED (U2). While enablement exists, the transceiver U1 can transmit data on the USB cable; otherwise the transceiver is in receive mode.

Figure 7:
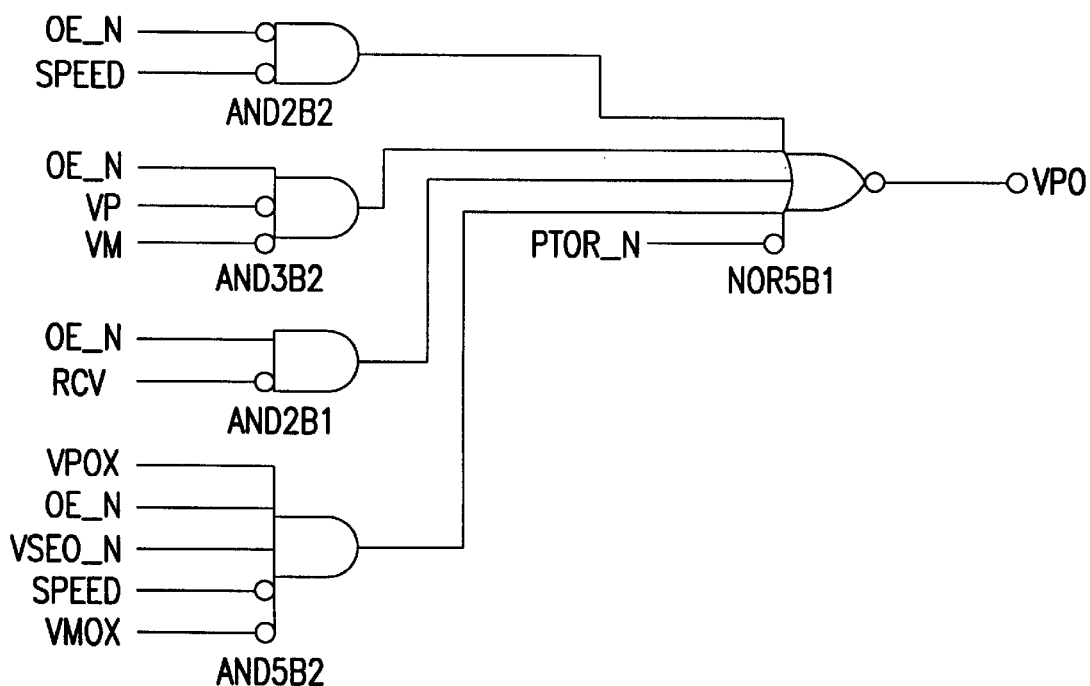
FIG. 7 is a logic circuit for a logic state shown in FIG. 3.
Figure 7:
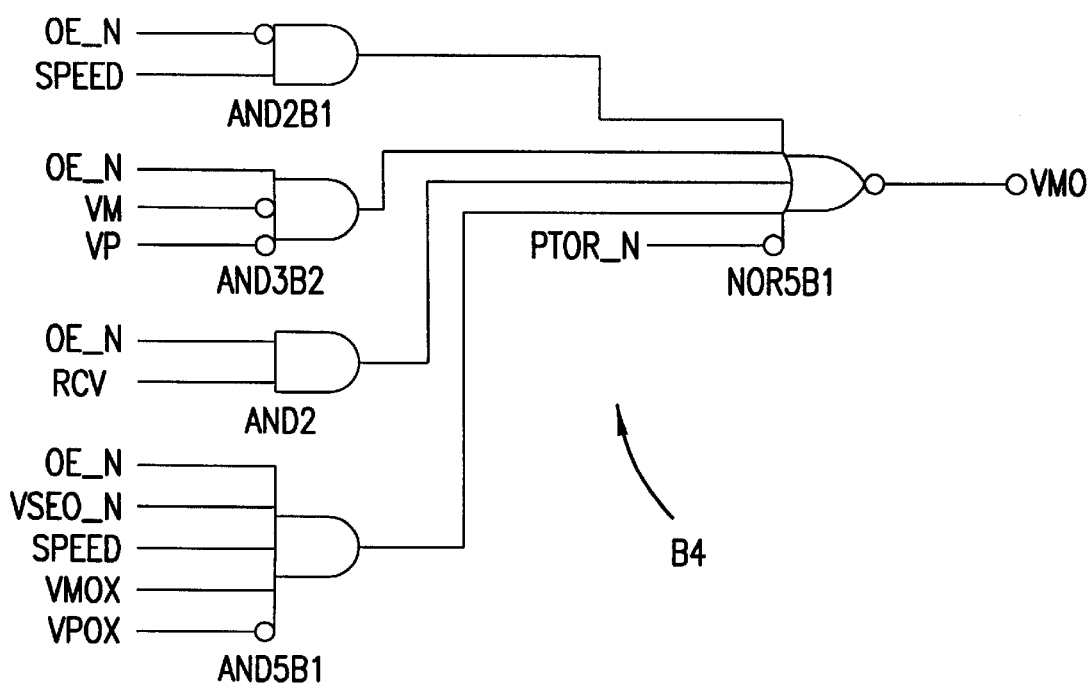

Logic block B4 (which in this example is a hard coded logic circuit FIG. 7) effects signal outputs VPO and VMO which are VPOD and PMOD to the driver circuit for sending out on the extender cable to the upstream port. Table 3 shows the basic logic of this circuit with the primary inputs. The other inputs to the circuit ensure coordination with other signals. ("OE" in the table and OE_N in the figure mean DN_OE_N.)

TABLE 3

| | In: | | | | Out: | | |
|---|---|---|---|---|---|---|---|
| | VP | VM | RCV | OE | SPEED | VPO | VMO | Result |
| 1. | na | na | na | 0 | 0 | 0 | 1 | Pass speed only |
| 2. | na | na | na | 0 | 1 | 1 | 0 | " |
| 3. | 0 | 1 | 0 | 1 | na | 0 | 1 | Data out |
| 4. | 1 | 0 | 0 | 1 | na | 0 | 1 | " |
| 5. | 1 | 0 | 1 | 1 | na | 1 | 0 | " |
| 6. | 0 | 1 | 1 | 1 | na | 1 | 0 | " |
| 7. | 0 | 0 | na | 1 | na | 0 | 0 | SE0 |
| 8. | 1 | 1 | na | 1 | na | Keep previous output | | |

Inputs are RCV (data) and VP and VM (speed level), EO (output enablement) and speed. Lines 1 and 2 indicate that with enablement to the transceiver (VSEO_N<=0), SPEED level designates which J-state idle signals go into the extender cable. The next lines 3–6 show passing of the RCV signal data from the transceiver to the extender cable only when there is no enablement (OE=1) such that the transceiver is in receive mode. The SPEED signal is not relevant at this stage, since speed in this instance is designated by VP,VM which adjust the output according to J-state. The line 7 condition passes SE0. The line 8 condition of error maintains any previous signal.

Figure 8A:
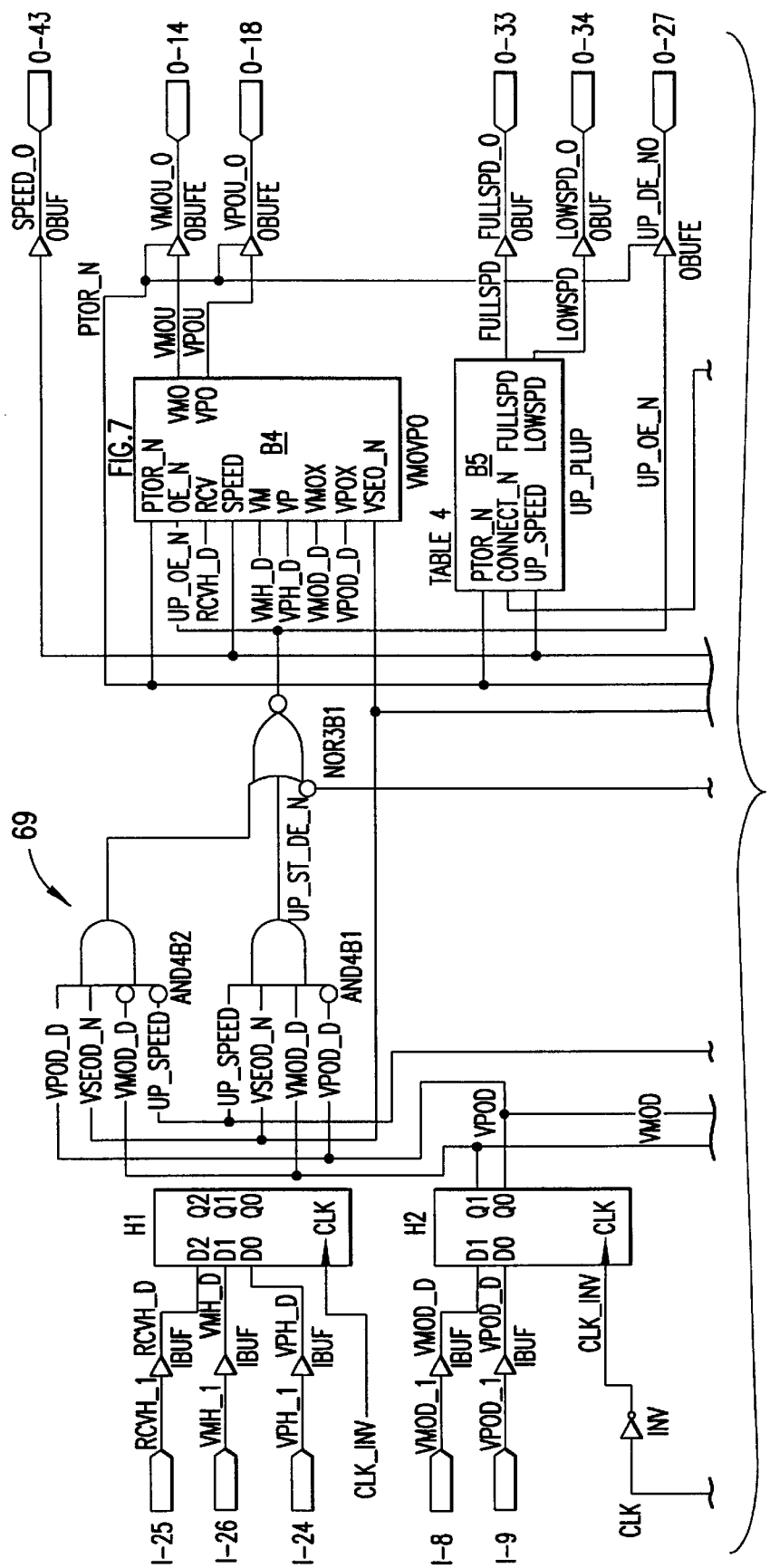
FIG. 8 is a block diagram of circuitry and logic states for a downstream controller in the other extender port of FIG. 1.
Figure 8B:
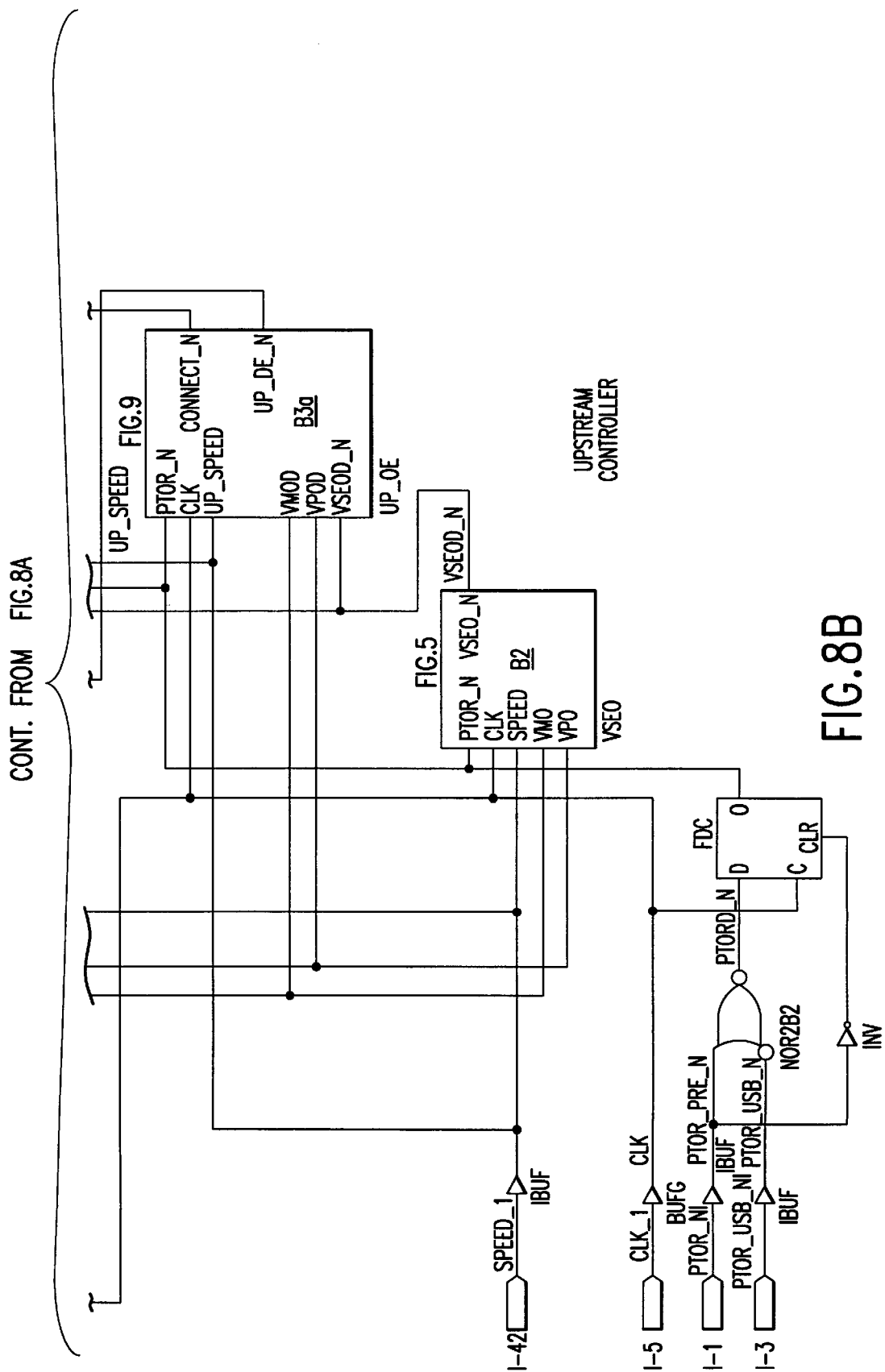

Logic for the controller of the upstream port (FIG. 8) near the host is similar to that of FIG. 3, with an additional hierarchy block B5. Extender signals from the downstream port are digitized and forwarded to the controller terminals VPOD and VMOD. (Letter "U" designates upstream port signals; "D" designates signals coming from the downstream port; "H" designates from USB host. Such designations including "UP" and "DN" would also be reversed in the port circuit diagram (FIG. 2) to conform.) In the same manner as for downstream, signals from the host via USB cable are converted by the transceiver U1, and corresponding signals are applied to the logic device input terminals RCVH (from RCV), VPH (from VP) and VMH (from VM). Clock (CLK) and reset (PTOR) signals are also as for the downstream port. An additional reset signal input PTOR_USB_N is directed into reset PTOR_N through a NOR gate NOR2B2. An FDC block is an input latch enabling synchronization to the clock similarly to H1 and H2. In the upstream port circuit, connections are made in each of the terminal pairs PTORUSB, FULLSPD and LOWSPD (these not being connected in the downstream port). Intermediate signal UP_ST_OE_N is fed through a set of hard coded logic gates 69 to effect the signal UP_OE_N.

An upstream state machine stage for speed level may be used. However, for simplicity, this stage is omitted in favor of utilizing the downstream speed signal SPD transmitted on the wire 70 (FIG. 1) in the extender cable. This speed wire is connected between the DN_SPEED terminal of the downstream port (FIG. 3) and (preferably) the DN_SPEED input (via resistor R54 to an opto isolator U11 (FIG. 2) that is in the upstream port only. The output of the isolator is fed to the state machines (FIG. 8) of the upstream controller as SPEED_I. Except for DC isolation, the signal from the isolator is substantially unchanged.

Block B2 for verified single ended zero is the same as for the downstream port (FIG. 5), with appropriate adjustment in the descriptions relative to host/peripheral and upstream/downstream. Its output signal is VSEOD_N.

Figure 9:
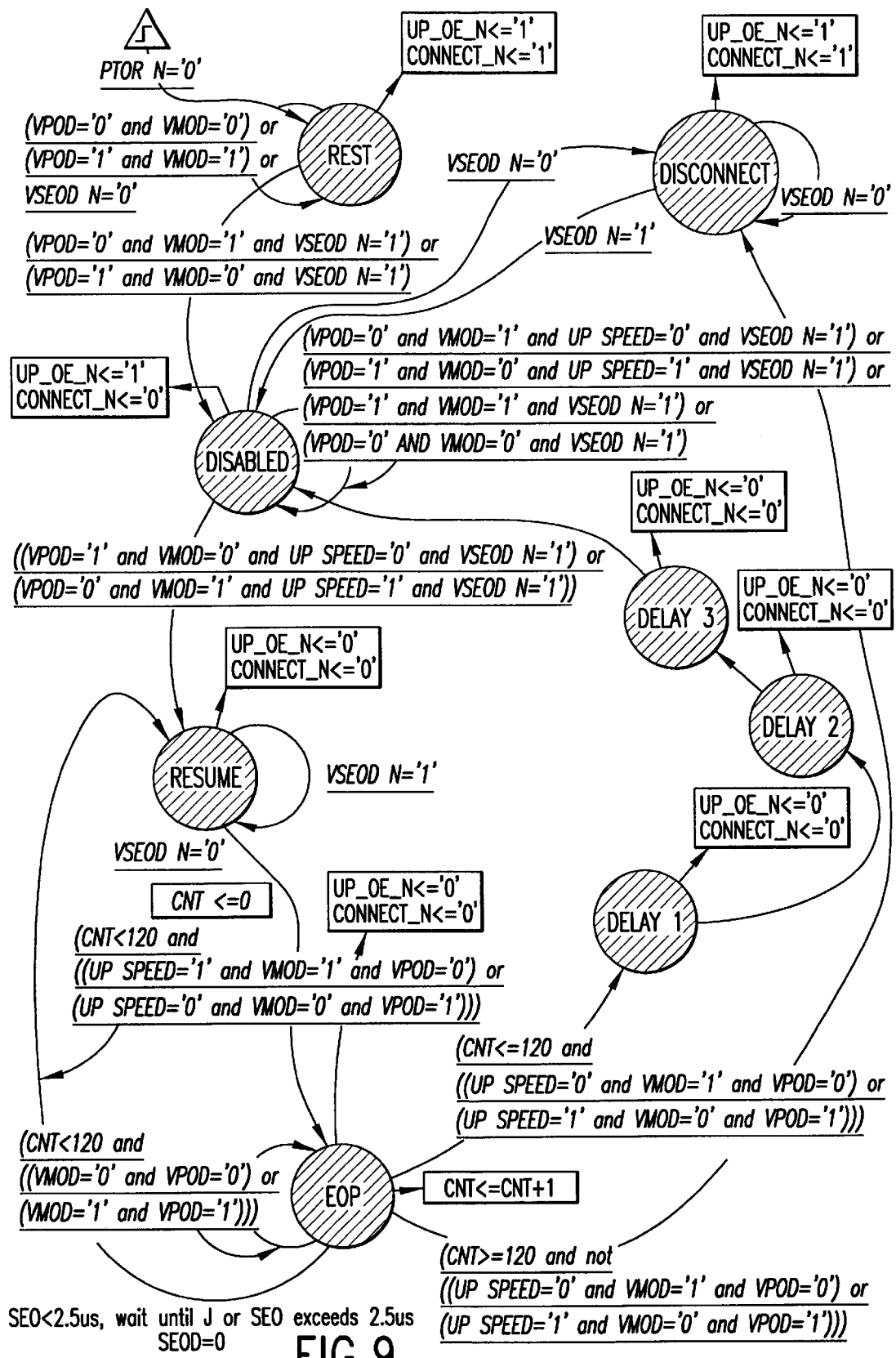
FIG. 9 is a diagram of a logic state machine for a logic state shown in FIG. 7.

Output enablement (OE) block B3 (FIG. 9) is similar to block B3 (FIG. 6) with an added test for connection of the cables. Inputs are from the extender cable (VPOD and VMOD) and verified single ended zero (VSEOD, from block B2) and the speed indicator (termed UP_SPEED in the upstream port). With a cable disconnected and power turned on, a "rest" state exists initially for no (i.e. zero) signals with continuing single ended zero (VSEOD_N=0), effecting a disablement signal (UP_OE_N<=1) and a disconnect signal CONNECT_N<=1. Continuation of SEO is assumed to indicate no connection between the host and peripheral at this stage. When a connection is made, signals come from the cable (helped by pullup explained below) and other logic states, thereby ending the SEO condition to generate the signal VSEOD_N=1 (verified SEO from B2) which switches the state to "disabled". As before, this state is with the idle J-state (or short SEO or error), with the added condition VSEOD_N=1 which indicates continued connection for the specified duration in B2 (filtering out spurious SEO). Corresponding signals UP_OE_N<=1 (disabled) and CONNECT_N<=0 (connected, active low) are effected from the "disabled" state. If there is a continuing verified SEO signifying disconnection, the signal VSEOD_N=0 goes to a "disconnect" state with corresponding disconnect and disablement signals.

Otherwise, when a K-state signal arrives to the "disabled" state, the state is switched to "resume" in recognition of start of packet ("SOP"), an enabling signal UP_OE_N<=0 is effected, and the connect signal is continued. This state is maintained as long as VSEOD_N<=1 signifies no valid SEO. When verified end of packet (EOP) is signaled by VSEOD_N=0, an "EOP" state is entered, maintaining the enable and connect signals. This EOP state may be held only for a short period, e.g. up to 2.5 $\mu$s (120 counts) according to USB specifications. If SEO condition exceeds this, disconnection is assumed and the state goes to "disconnect", effecting disconnect and disablement signals. Otherwise, when any other signal arrives, the state goes back to the "disabled" idle state, advantageously delayed somewhat by way of three "DELAY" states, effecting signal UP_OE_N<=1 (disable). Each DELAY state is one clock cycle. The enablement and other signals go to block B4 (Table 3) which operates the same as for the downstream unit to provide VPOU and VMOU signals to the transceiver U1.

An additional block B5 (Table 4) is provided in the upstream port for pullup of USB signals upon cable connection. A signal FULLSPD<=1 is effected when CONNECT_N=0 and UP_SPEED=1, and a signal LOWSPD<=1 is effected when CONNECT_N=0 and UP_SPEED=0. The appropriate signal is applied respectively to resistor R44 or R45 at the USB connection (FIG. 2) in the upstream port. Otherwise, no signal is applied from the logic device, pulldown occurring from associated resistors. The purpose is to more quickly apply J-state into the circuit and logic than may come in on the cable.

TABLE 4

| In: | | Out: | |
|---|---|---|---|
| CONNECT_N | UP_SPEED | FULLSPEED | LOWSPEED |
| 0 | 0 | Z | 1 |
| 0 | 1 | 1 | Z |
| 1 | 0 | Z | Z |
| 1 | 1 | Z | Z |

Z = No associated logic signal from U2.

Thus, for either port, incoming signals on an extender cable from the other port are used to determine a sequence covering start of packet (SOP), continuing of packet, end of packet (EOP) and a continuing single ended zero (SEO), so as to effect enablement of the transceiver for the packet sequence. The incoming signals then are passed into the transceiver for sending out on USB to a computer unit only during the enablement.

Incoming USE signals from the associated computer unit are processed by the transceiver into data signals (RCV) and speed signals (VP,VM). The latter, being on two lines and intermittently being non-speed data (SEO or error, Table 3), are converted to a speed indicator signal. This indicator signal is used to determine J-state for the enablement determination and for sending the J-state signals on the extender cable during idle. The RCV or SEO signals are passed through to the outgoing extender cable. When the incoming extender signals enable the transceiver, these signals take precedent, and signals are sent only one way.

It will be appreciated that a conventional transceiver, normally associated with a serial interface engine in a computer, is used for convenience because it is already available for USE interfacing under USE specifications. This USE logic unit effects the dual speed signals VP and VM which are merely intermediate in the present case. In a modified transceiver, or if this logic unit is effectively incorporated into the controller, the intermediate determination of dual speed signals may be eliminated in favor of a direct determination of the single speed indicator signal by the transceiver. Alternatively, the determination of the single speed indicator signal may be omitted, and the logic of the dual speed signals utilized directly where ever the indicator signal is referenced, particularly for effecting the enable signal and the outgoing USB signals. Moreover, although present USB specifications provide for two speed levels, three or more speeds may be feasible, in which case the present logic may be modified to accommodate this. In view of these alternatives, it will be appreciated that the logic means presented herein are merely examples and the best mode presently considered, and other means for the logic may be utilized within the present invention. Similarly, the analog circuit details may be varied by those of ordinary skill in the art.

The present apparatus provides for extension of cables between two cable units beyond the limits prescribed by the USB specifications. To do this, the circuitry to the extender cables should have impedance characteristics that allow the longer transmission distance with sufficient signal/noise ratio.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An apparatus for extending USB linkage between a first computer unit and a second computer unit respectively having a first USB port and a second USB port for the linkage, wherein the apparatus comprises a first extender port having first connection means for connecting with the first USB port to pass USB signals therebetween, a second extender port having second connection means for connecting with the second USB port to pass USB signals therebetween, a first extender cable for connection to carry first extender signals from the first extender port to the second extender port, and a second extender cable for connection to carry second extender signals from the second extender port to the first extender port;

the first extender port being receptive of first incoming USB signals from the first USB port to effect the first extender signals as representative of the first USB signals, the second extender port being receptive of the first extender signals to effect first outgoing USB signals to the second USB port, and the first outgoing USB signals being representative of the first extender signals, such that the first outgoing USB signals are substantially identical to the first incoming USB signals; and the second extender port being receptive of second incoming USB signals from the second USB port to effect the second extender signals as representative of the second USB signals, the first extender port being receptive of the second extender signals to effect second outgoing USB signals to the first USB port, and the second outgoing USB signals being representative of the second extender signals, such that the second outgoing USB signals are substantially identical to the second incoming USB signals.

2. The apparatus of claim 1 wherein the first extender cable and the second extender cable are connected between the first extender port and the second extender port.

3. The apparatus of claim 1 wherein:
the first extender port comprises a first interface circuit with the first connection means, a first driver circuit for connection to the first extender cable so as to transmit the first extender signals, a first receiver circuit for connection to the second extender cable so as to be receptive of the second extender signals, and a first controller operatively connected between the first interface circuit, the first receiver circuit and the first driver circuit to selectively effect the second outgoing USB signals or the first extender signals; and the second extender port comprises a second interface circuit with the second connection means, a second driver circuit for connection to the second extender cable so as to transmit the second extender signals, a second receiver circuit for connection to the first extender cable so as to be receptive of the first extender signals, and a second controller operatively connected between the second interface circuit, the second receiver circuit and the second driver circuit to selectively effect the first outgoing USB signals or the second extender signals.

4. The apparatus of claim 3 wherein the first extender cable is connected between the first receiver circuit and the second driver circuit, and the second extender cable is connected between the second receiver circuit and the first driver circuit.

5. The apparatus of claim 4 further comprising a combined extender cable comprising the first extender cable and the second extender cable.

6. The apparatus of claim 5 wherein the first extender port further comprises a first power supply for powering circuit components and signals of the first extender port, the first power supply comprising a first input connector receptive of a power source and a first output connector connected to the first input connector, the second extender port further comprises a second power supply for powering circuit components and signals of the second extender port, the second power supply comprising a second input connector for power input, and the combined extender cable further comprises a power line connecting the first output connector and the second input connector so as to be receptive of the power source.

7. The apparatus of claim 3 wherein each controller comprises a logic device.

8. The apparatus of claim 7 wherein each interface circuit comprises a USB logic unit.

9. The apparatus of claim 8 wherein the USB logic unit comprises a USB transceiver.

10. The apparatus of claim 8 wherein the logic device includes the USB logic unit.

11. The apparatus of claim 3 wherein, for each extender port, the receiver circuit effects receiver signals representative of the extender signals incoming to the receiver circuit, the interface circuit is receptive of the receiver signals to selectively effect outgoing USB signals representative of the receiver signals, the controller comprises enabling signal means receptive of the receiver signals to effect an enabling signal that signifies enablement only while the incoming extender signals contain a packet sequence and otherwise signifies disablement, and the interface circuit comprises enabling means receptive of the enabling signal for enabling transmission of the outgoing USB signals only during enablement, whereby the outgoing USB signals are transmitted only while the incoming extender signals contain the packet sequence.

12. The apparatus of claim 11 wherein the USB signals have a signal protocol including representation of a selected speed of transmission such that recognition of a packet is dependent on selected speed, the interface circuit effects interface signals representative of the incoming USB signals, and the interface signals comprise speed signals representative of selected speed, and the enabling signal means is receptive of the speed signals along with the receive signals to effect the enabling signal.

13. The apparatus of claim 12 wherein:
the interface signals comprise speed signals representative of selected speed;
each USB cable and each extender cable comprises a pair of conductors for carrying separate signals having a relativity with a signal sequence comprising an idle condition, a packet and zero signals, the extender signals being such separate signals, and the idle condition being representative of selected speed; and
the enabling signal means comprises a series of logic states including a disabled state, a packet state and an end-of-packet state, and further comprises means for acknowledging continuing zero signals to effect a verify signal signifying end of packet, means receptive of the extender signals and the speed signals for maintaining the disabled state during the idle condition, means receptive of the extender signals and the speed signals for switching to and maintaining the packet state during reception of a packet, means receptive of the verify signal for switching to the end-of-packet state, means for maintaining the end-of-packet state during further continuing zero signals, means receptive of the extender signals for switching to the disabled state upon return of idle condition, and means for effecting the enabling signal during the packet state and the end-of-packet state.

14. The apparatus of claim 13 wherein the speed signals are intermittently representative of non-speed data, the controller further comprises means for converting the speed signals into a speed indicator signal representative only of selected speed, and the indicator signal is utilized with the extender signals for maintaining the disabled state and for switching to and maintaining the packet state.

15. The apparatus of claim 12 wherein the interface signals further comprise data signals, and the controller is receptive of the data signals, the speed signals and the enable signal to effect the outgoing extender signals only during disablement of the outgoing USB signals.

16. The apparatus of claim 15 wherein the speed signals are intermittently representative of non-speed data, the controller further comprises means for converting the speed signals into a speed indicator signal representative only of selected speed, and the indicator signal is utilized with the data signals, the speed signals and the enable signal to effect the outgoing extender signals.

17. The apparatus of claim 16 wherein the speed indicator signal is representative of the speed signals to effect the enabling signal with the receiver signals.

18. The apparatus of claim 12 wherein:

the speed signals are intermittently representative of non-speed data, the first controller further comprises means for converting the speed signals into a speed indicator signal representative only of selected speed, and the indicator signal is representative of the speed signals to effect the enabling signal with the receiver signals;

the first extender port further comprises a first power supply for powering circuit components and signals of the first extender port, the first power supply comprising a first input connector receptive of a power source and a first output connector connected to the first input connector, the second extender port further comprises a second power supply for powering circuit components and signals of the second extender port, the second power supply comprising a second input connector for power input; and the apparatus further comprises a combined extender cable containing the first extender cable, the second extender cable, a signal line connected to transmit the speed indicator signal to the second controller, and a power line connecting the first output connector and the second input connector.

* * * * *